(12) United States Patent
Yoshimura (10) Patent No.: US 8,375,979 B2
(45) Date of Patent: Feb. 19, 2013

(54) SELECTOR VALVE DEVICE

(75) Inventor: Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 574 days.

(21) Appl. No.: 12/650,983

(22) Filed: Dec. 31, 2009

(65) Prior Publication Data

US 2010/0181510 A1 Jul. 22, 2010

(30) Foreign Application Priority Data

Jan. 21, 2009 (JP) .................................. 2009-011291

(51) Int. Cl.
*F16K 31/06* (2006.01)

(52) U.S. Cl. .............. 137/315.03; 137/315.09; 137/884; 251/129.15

(58) Field of Classification Search ............. 137/315.09, 137/315.27, 315.03, 884; 251/129.15, 284
See application file for complete search history.

(56) References Cited

U.S. PATENT DOCUMENTS

| | | | |
|---|---|---|---|
| 4,718,451 A * | 1/1988 | Kosugi | ..................... 137/596.16 |
| 5,333,647 A | 8/1994 | Fukano et al. | |
| 6,854,707 B2 * | 2/2005 | Miyazoe | ................... 251/129.15 |
| 7,677,264 B2 * | 3/2010 | Miyazoe et al. | ............... 137/269 |

FOREIGN PATENT DOCUMENTS

| | | | |
|---|---|---|---|
| GB | 2129097 A * | 5/1984 | |
| JP | 4-62474 | 5/1992 | |
| JP | 4-272583 | 9/1992 | |

\* cited by examiner

*Primary Examiner* — Stephen M Hepperle
*Assistant Examiner* — Daniel Edelbrock
(74) *Attorney, Agent, or Firm* — Oblon, Spivak, McClelland, Maier & Neustadt, L.L.P.

(57) ABSTRACT

On a valve body of a selector valve mounted on a base member, a bolt insertion hole extending across a valve hole within a width of the valve body is formed, a mounting bolt is inserted into the bolt insertion hole so as to cross the valve hole and a valve member. A distal end of the mounting bolt is screwed into a screw hole of the base member so as to fix the selector valve to the base member, while on the valve member, in order to avoid contact between the valve member and the mounting bolt, a hole-shaped or recess-shaped escape portion extending longer in an operating direction of the valve member is formed, and the mounting bolt is inserted through the escape portion.

14 Claims, 9 Drawing Sheets

SELECTOR VALVE DEVICE

TITLE OF THE INVENTION

BACKGROUND OF THE INVENTION

1. Field of the Invention

The present invention relates to a selector valve device in which a selector valve is fixed to a base member such as a sub plate, a manifold base and the like with a mounting bolt and particularly to a selector valve device suitable for a case of a plurality of selector valves mounted in close alignment on a base member.

2. Description of the Related Art

If a selector valve device is formed by closely aligning and mounting a plurality of selector valves on a base member such as a sub plate, a manifold base and the like, the valve is screwed into a screw hole of the base member in general by inserting a mounting bolt through a bolt insertion hole provided in a valve body of each selector valve. In this case, since the bolt insertion hole is provided at a position not crossing a valve hole inside the valve body, a lateral width of the valve body is increased by a portion of the bolt insertion hole, and if a plurality of electromagnetic valves are consecutively provided on the base member and controlled in a centralized manner or the like, a large body width of each of the electromagnetic valves prolongs the consecutive installation length of the selector valves, and the size of the entire selector valve device is increased.

Thus, reduction in the entire length of the base member on which a large number of electromagnetic valves are mounted as much as possible is in demand, and as a result, reduction in the valve body width mounted on the base member is in demand.

For these demands, a valve-body mounting mechanism not using a mounting bolt is proposed in Japanese Unexamined Utility Model Registration Application Publication No. 4-62474 and Japanese Unexamined Patent Application Publication No. 4-272583. This mounting mechanism is effective in a point that since the mounting bolt is not used, the valve body width of the selector valve can be reduced. However, since this mounting mechanism valve uses means for locking engagement fittings at plural spots on a mounting face of the valve body to the base member, an extremely complicated structure cannot be avoided as compared with fixation of the valve body by screwing the mounting bolt through the bolt insertion hole.

Therefore, a new mounting technique that can easily mount the selector valve to the base member without increasing the valve body width while using the mounting bolt is in demand.

SUMMARY OF THE INVENTION

A technical problem of the present invention is to provide a selector valve device in which a selector valve is formed while being fixed to a base member by a new mounting method using a mounting bolt.

In order to solve the above problem, according to the present invention, a selector valve device in which a selector valve is fixed to a base member with a mounting bolt is provided. The selector valve has a valve body having a mounting face to be mounted on the base member as a bottom face, a valve hole extending in parallel with the mounting face inside the valve body, a plurality of ports communicating with each other through the valve hole, an operating member moving in the axial direction in the valve hole at switching of a flow passage between ports, and an electromagnetic operation portion for operation of the operating member, the valve body has a bolt insertion hole extending in a direction crossing the valve hole within a width of the valve body, the mounting bolt is inserted into the bolt insertion hole so as to cross the valve hole and the operating member, the operating member has a hole-shaped or recess-shaped escape portion for avoiding contact with the mounting bolt, and the mounting bolt passes through the escape portion.

In the present invention, in order to prevent rotation of the operating member and to prevent contact with the mounting bolt, it is preferable that a projection portion is formed on a side face of the operating member, and a guide groove to which the projection portion is fitted is formed in a hole wall of the valve hole elongated in the axial direction of the valve hole.

In addition, a portion of the valve hole crossed by the mounting bolt is preferably shut off from the flow passage by a seal member mounted on the operating member.

In the present invention, the operating member is any of a valve member, a slider disposed in the valve hole for transmitting an operation force from the electromagnetic operation portion to the valve member, and a piston transmitting the operation force from the electromagnetic operation portion to the valve member.

In an aspect of the present invention, the mounting bolts are disposed in two pieces so as to cross the valve hole and the operating member at two spots in the valve body.

Also, in another aspect of the present invention, the single mounting bolt is disposed at one spot in the valve body, and in order to prevent rotation of the valve body around the mounting bolt, a rotation prevention mechanism for having the valve body and the base member locked with each other is provided at a position far from the valve hole and the operating member of the valve body.

The rotation prevention mechanism may be a setscrew or may be a locking portion and a locking receiving portion formed on the valve body and the base member to be locked with each other.

According to the present invention, without increasing the valve body width even though the mounting bolt is used, and moreover even by arranging the mounting bolt at a position crossing the valve hole and the valve member, the selector valve can be easily mounted on the base member without affecting an operation of the valve member.

DESCRIPTION OF THE PREFERRED EMBODIMENTS

FIGS. 1 to 4 show a first embodiment of a selector valve device according to the present invention, and this selector valve device has a selector valve 2 mounted on a base member 1.

The selector valve 2 is an electromagnetic valve, and this electromagnetic valve is, as shown in FIGS. 1 to 4, provided with a valve body 11 provided with two parallel valve holes 12 in which a plurality of ports 14 to 17 are opened, a main valve portion 10 provided with two spool-shaped valve members 20 slidably disposed on each of the valve holes 12 for switching flow passages between the plurality of ports 14 to 17, and an electromagnetic operation portion 40 for driving the valve member 20.

Figure 1:
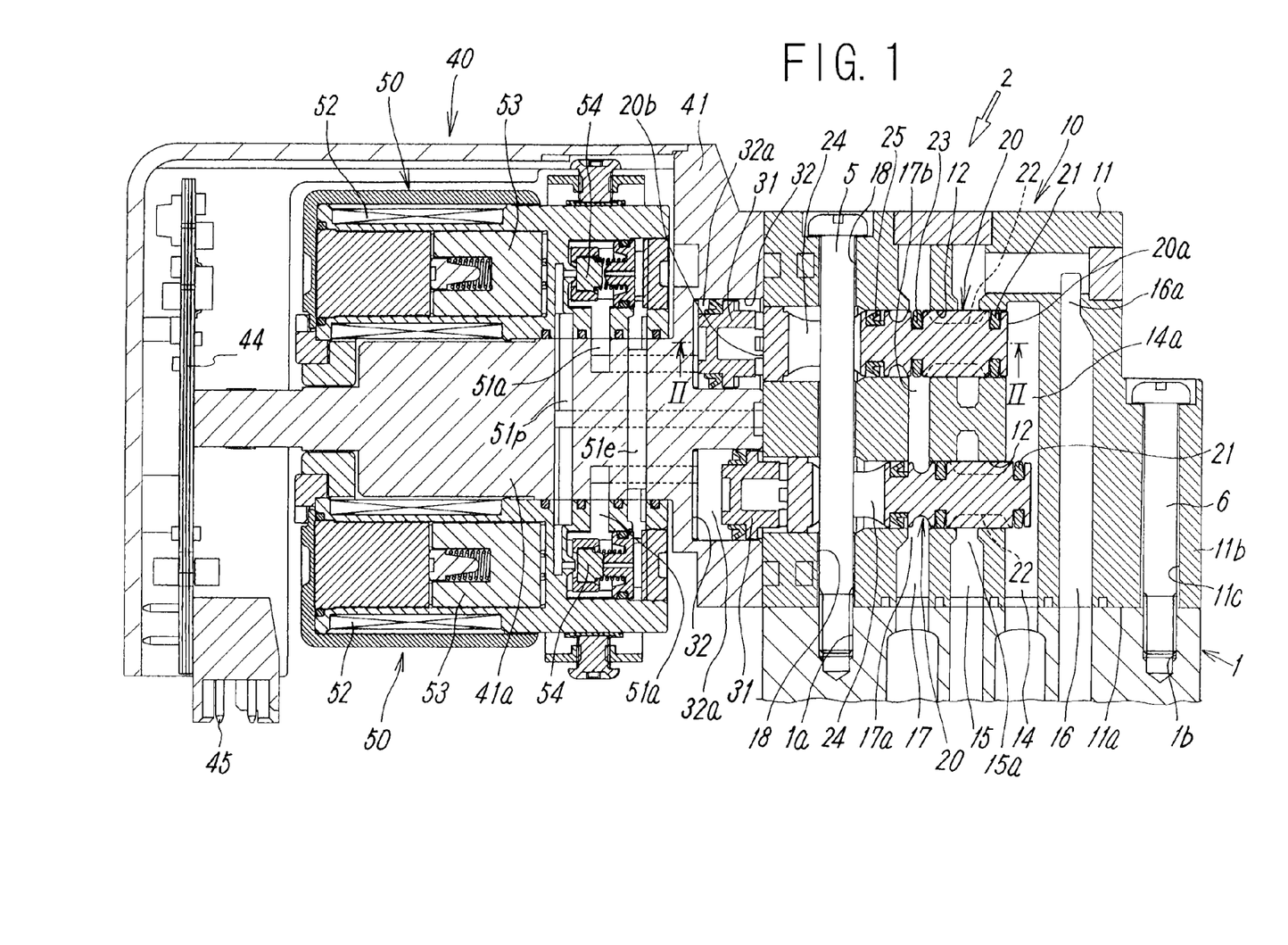
FIG. 1 is a longitudinal sectional view of a first embodiment of the present invention.

The valve member 20 forms an operating member moving within the valve hole 12 with a piston 31, which will be described later, at switching of the flow passage.

With regard to the selector valve 2 in this first embodiment, the two valve holes 12 are provided while being aligned vertically in the single valve body 11, and the two valve members 20 independently driven by the electromagnetic operation portion 40 are provided in each of the valve holes 12. But the present invention is not limited to such a selector valve but may be a selector valve provided with a single valve hole, which will be described later in FIG. 5 or 10, as in a second or fourth embodiment or may be a selector valve of 2-5 ports provided with a plurality of valve holes and valve members. A pilot electromagnetic valve, which will be described later, for driving the valve member 20 is provided according to the number of the valve holes 12 and the number of the valve members. The same applies to each of the embodiments described below.

The valve body 11 of the selector valve 2 is formed with a length in the front and rear direction (longitudinal direction) larger than a length in the right and left direction (width direction), and an elongate and flat mounting face 11a extending in the front and rear direction of the valve body 11 is formed on a lower face of the valve body 11. In addition, both right and left side faces of the valve body 11 are flat faces. The valve hole 12 extends in the front and rear directions of the valve body 11 similarly to the mounting face 11a. That is, axes of the two valve holes 12 extend in parallel with the mounting face 11a of the valve body 11 and cross the width direction of the valve body 11 at a right angle. Even if the number of the valve holes 12 to be provided is one, the axis of the valve hole 12 is directed in parallel with the mounting face 11a of the valve body 11.

Details of the plurality of ports 14 to 17 opened in the valve hole 12 are a supply port 14 supplying compressed air from an air pressure source to the both valve holes 12 through a supply flow passage 14a, one of output ports 15 made to communicate with or to be shut off from the supply port 14 by an operation of the valve member 20 inserted into the lower valve hole 12, the other output port 16 made to communicate with or to be shut off from the supply port 14 by the operation of the upper valve member 20, and a discharge port 17 made to communicate with or shut off from the output ports 15, 16 by the operation of the both valve members 20.

The supply flow passage 14a is formed at positions communicating with end portions of the two valve holes 12, and first end faces 20a of one ends of the two valve members 20 are faced with the supply flow passage 14a, by which a supply fluid pressure acts on the first end face 20a as a returning force of the valve member 20. A face on the opposite side of the first end face 20a of the valve member 20 is a second end face 20b facing the electromagnetic operation portion 40 side.

When a seal member 21 of the valve member 20 is moved from a sealing position (See the upper valve member) on a land of the end portion on the supply flow passage 14a side of both valve holes 12 to a communication position (See the lower valve member) within the supply flow passage 14a, a supply fluid flows into the output ports 15, 16 from the supply flow passage 14a through a communication recess portion 22 formed in the valve member 20. Also, the one output port 15 communicates with the valve hole 12 through an output flow passage 15a communicating with the lower valve hole 12, while the other output port 16 communicates with the valve hole 12 through an output flow passage 16a communicating with the upper valve hole 12, and the discharge port 17 communicates with the both valve holes 12 through discharge flow passages 17a and 17b.

Figure 2:
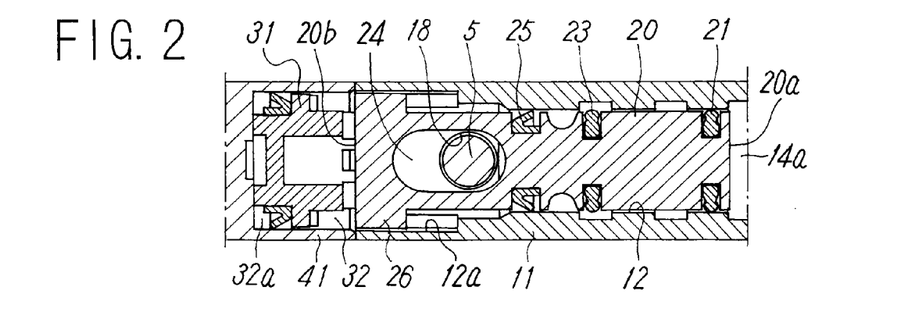
FIG. 2 is an enlarged sectional view at II-II position in FIG. 1.
Figure 3:
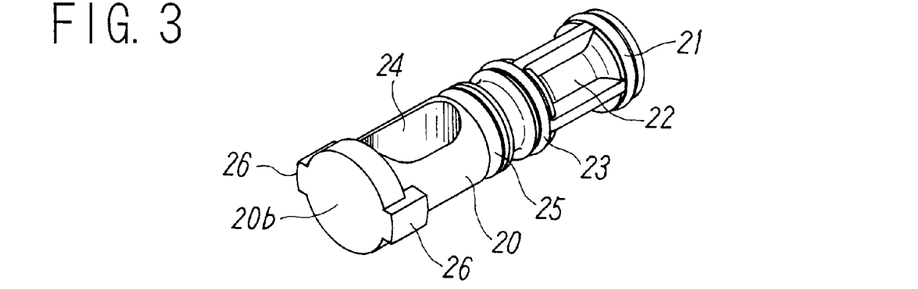
FIG. 3 is a perspective view of a valve member in the first embodiment.

The above two valve members 20 both have the same form as shown in FIG. 3, and FIG. 2 shows a sectional shape of the valve member 20. The valve member 20 has the seal member 21 for communication/shutting off of the supply port 14 and the output ports 15, 16 and a seal member 23 for communication/shutting off of the output ports 15, 16 and the discharge port 17.

In each of the first embodiment and the embodiments shown below, the valve member 20 is a spool sliding within the valve hole 12, but the valve member 20 may be a valve member for poppet valve attached with a valve seal at a shaft portion moving within the valve hole 12.

In addition, in order to fix the valve body 11 to the base member 1 with the mounting bolt 5, at a portion close to the end portion on the electromagnetic operation portion 40 side in the valve body 11, a bolt insertion hole 18 is provided so as to cross the two valve holes 12 and the two valve members 20 within the width of the valve body 11 and vertically penetrating the valve body 11. A position where the bolt insertion hole 18 crosses the valve hole 12 needs to be a position not affecting a switching function of the flow passage by the valve member 20, and thus, in this first embodiment, the bolt insertion hole 18 is formed at a portion which is shut off by the seal member 25 of the valve member 20 so that a pressure fluid does not flow between the ports. However, an opened position of the bolt insertion hole 18 is not limited to the above-mentioned position but may be a position, which will be described later.

In the two valve members 20, a long-hole shaped escape portion 24 through which the mounting bolt 5 passes is provided so as to vertically penetrate the valve member 20. This escape portion 24 needs to be opened on the axis of the bolt insertion hole 18 all the time regardless of the operation position of the valve member 20 so that movement of the valve member 20 is not prevented by the mounting bolt 5. That is, since the valve member 20 moves for switching of the flow passage, the member needs to be in a hollow shape in order to enable the movement, and the escape portion 24 is made as a long hole elongated in the axial direction of the valve member 20.

Then, as shown in FIG. 1, the single mounting bolt 5 is inserted so as to penetrate the bolt insertion hole 18 of the valve body 11 and the escape portion 24 of the valve member 20, and a male screw portion at a distal end of the mounting bolt 5 is screwed into a screw hole 1a of the base member 1 so that the valve body 11 is fixed to the base member 1.

In this first embodiment, since the bolt insertion hole 18 is provided at the center in the width direction of the valve body 11, the escape portion 24 of the valve member 20 is also provided at the center in a diameter direction of the valve member 20 and is made as a long hole elongated in the axial direction of the valve member 20. However, the bolt insertion hole 18 can be shifted to one side of right or left of the valve body 11 within the width of the valve body 11, and in this case, the escape portion 24 can be also formed with the shift to a side of the valve member 20. In such a case, the escape portion 24 can be formed in a recess shape opened on one side of the valve member 20.

A projecting portion 26 provided on both right and left side faces of the second end face 20b of the valve member 20 is fitted in a guide groove 12a provided in an inner face of the valve hole 12 so as to prevent the valve member 20 from being rotated and also prevents the inner face of the escape portion 24 from touching the mounting bolt 5.

The electromagnetic operation portion 40 driving the two valve members 20 has two pilot electromagnetic valves 50 applying a pilot fluid pressure to the piston 31 in contact with the second end face 20b of each of the valve members 20 and is constituted so as to drive the valve member 20 through the piston 31 by the pilot fluid pressure supplied to/discharged from a piston chamber 32 by switching of the pilot electromagnetic valve 50. The piston chamber 32 is provided corresponding to a position of each of the valve holes 12 in the valve body 11 on a connected face with the valve body 11 of an adapter block 41 connecting the electromagnetic operation portion 40 to the valve body 11, and the piston 31 is accommodated in the piston chamber 32 so that a part of the piston 31 is brought into contact with the valve member 20 and enters into the valve hole 12 at switching of the flow passage and forms the operating member together with the valve member 20.

The piston 31 in the first embodiment is formed separately from the valve member 20 and brought into contact with the valve member 20 but the piston 31 may be formed integrally with the valve member 20.

The piston chamber 32 has a diameter larger than that of the valve hole 12 and has a sectional area approximately twice of the sectional area of the valve hole 12, and a pilot output passage 51a of the pilot electromagnetic valve 50 communicates with a pressure chamber 32a formed in the piston chamber 32. The pressure chamber 32a is formed on the side opposite the contact portion brought into contact with the valve member 20 of the piston 31. If a pilot fluid pressure is supplied to the pressure chamber 32a through the pilot output passage 51a, the valve member 20 is pressed by the piston 31, and the valve member 20 is moved to a position (position of the lower valve member 20 in FIG. 1) having the supply flow passage 14a communicate with the output flow passage 15a or 16a.

In this case, since the supply fluid pressure in the supply flow passage 14a acts onto the first end face 20a of the valve member 20, the valve member 20 is driven against an action force of the fluid pressure. On the other hand, if the pilot fluid pressure stops acting on the piston 31 by switching of the pilot electromagnetic valve 50, the valve member 20 is pushed back by the supply fluid pressure in the supply flow passage 14a and returns to an original position (position of the upper valve member 20 in FIG. 1) by pressing the piston 31.

The adapter block 41 connected to the valve body 11 has an intermediate base 41a extending horizontally from the intermediate position, the pilot electromagnetic valve 50 is mounted on both upper and lower faces of the intermediate base 41a, and each port of the pilot electromagnetic valve 50 communicates with a required portion, which will be described later, through a pilot flow passage provided in this adapter block 41. Also, a substrate 44 on which a connector 45 to be connected to a power source or the like is provided is mounted on the adapter block 41, and this connector 45 is electrically connected to a coil terminal of each of the pilot electromagnetic valve 50 through printed wiring on the substrate 44.

The two pilot electromagnetic valves 50 are 3-port electromagnetic valves, respectively. This 3-port electromagnetic valve drives a pilot valve body 54 through a movable iron core 53 driven by excitation and cancellation of a solenoid 52, by which a communication state between the pilot output passage 51a and a pilot supply passage 51p as well as a pilot discharge passage 51e is switched. The pilot supply passage 51p of the both pilot electromagnetic valves 50 communicates with the supply flow passage 14a through respective flow passages, not shown, while the pilot output passage 51a of the both pilot electromagnetic valves 50 communicates with the pressure chamber 32a of the respective pistons 31, as mentioned above, and the pilot discharge passage 51e of the both pilot electromagnetic valves 50 is opened to the atmospheric air through a flow passage, not shown. The pilot supply passage 51p, the pilot output passage 51a, and the pilot discharge passage 51e are electrically conducted to required portions through the adapter block 41.

As mentioned above, by fixing the valve body 11 to the base member 1 by the mounting bolt 5 inserted through the bolt insertion hole 18 and the escape portion 24 of the valve member 20 within the width of the valve body 11, the mounting bolt 5 can have a relatively large diameter, and the valve body 11 can be firmly fixed to the base member 1. In this case, to provide a rotation prevention mechanism for suppressing rotation of the valve body 11 around a bolt shaft of the mounting bolt 5 is effective in stable fixation. As this rotation prevention mechanism, a setscrew 6 is used in this first embodiment. That is, a projection portion 11b for fixation is provided at a position separated from a fixed position by the mounting bolt 5 in the valve body 11, that is, a position separated from the valve hole 12 and the valve member 20 at an end portion on the side opposite the connection end of the electromagnetic operation portion 40 in the valve body 11, a screw insertion hole 11c is provided in the projection portion 11b, and the setscrew 6 inserted through the screw insertion hole 11c is screwed in a screw hole 1b in the base member so that the valve body 11 is locked by the base member 1.

The setscrew 6 may be similar to the mounting bolt 5 or may be smaller than that, but the setscrew is mounted within the width of the valve boy 11 exactly similar to the mounting bolt 5.

This rotation prevention mechanism can employ various means as will be described later, not limited to the setscrew 6.

In the selector valve device having the above-mentioned configuration, when the valve body 11 of the selector valve 2 is to be fixed to the base member 1, the valve body 11 is fixed by the mounting bolt 5 at a position not causing increase in the body width of the valve body 11, that is, within the width of the valve body 11 without obstructing the operation of the valve member 20. Thus, with the simple configuration, the body width of the valve body 11 can be reduced similarly to the prior-art case not using the mounting bolt.

Figure 4:
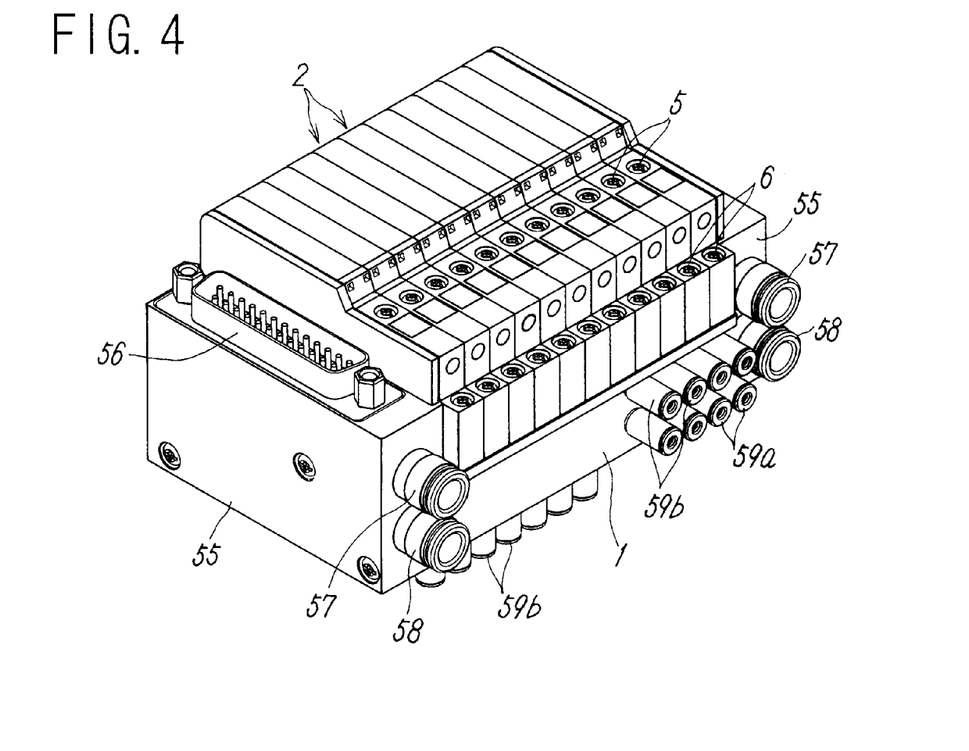
FIG. 4 is a perspective view of the first embodiment of the present invention.

FIG. 4 shows a state in which a plurality of the selector valves 2 are fixed to the base member 1. In this figure, reference numeral 55 denotes an end block sandwiching the plurality of selector valves 2 arranged in parallel on the base member 1 from both sides, reference numeral 56 denotes a connector for power supply and electrical signal transmission, reference numeral 57 denotes a supply pipe joint for supply in a lump sum, reference numeral 58 denotes a pipe joint for discharge in a lump sum, and reference numerals 59a and 59b denote pipe joints for output port.

Figure 5:
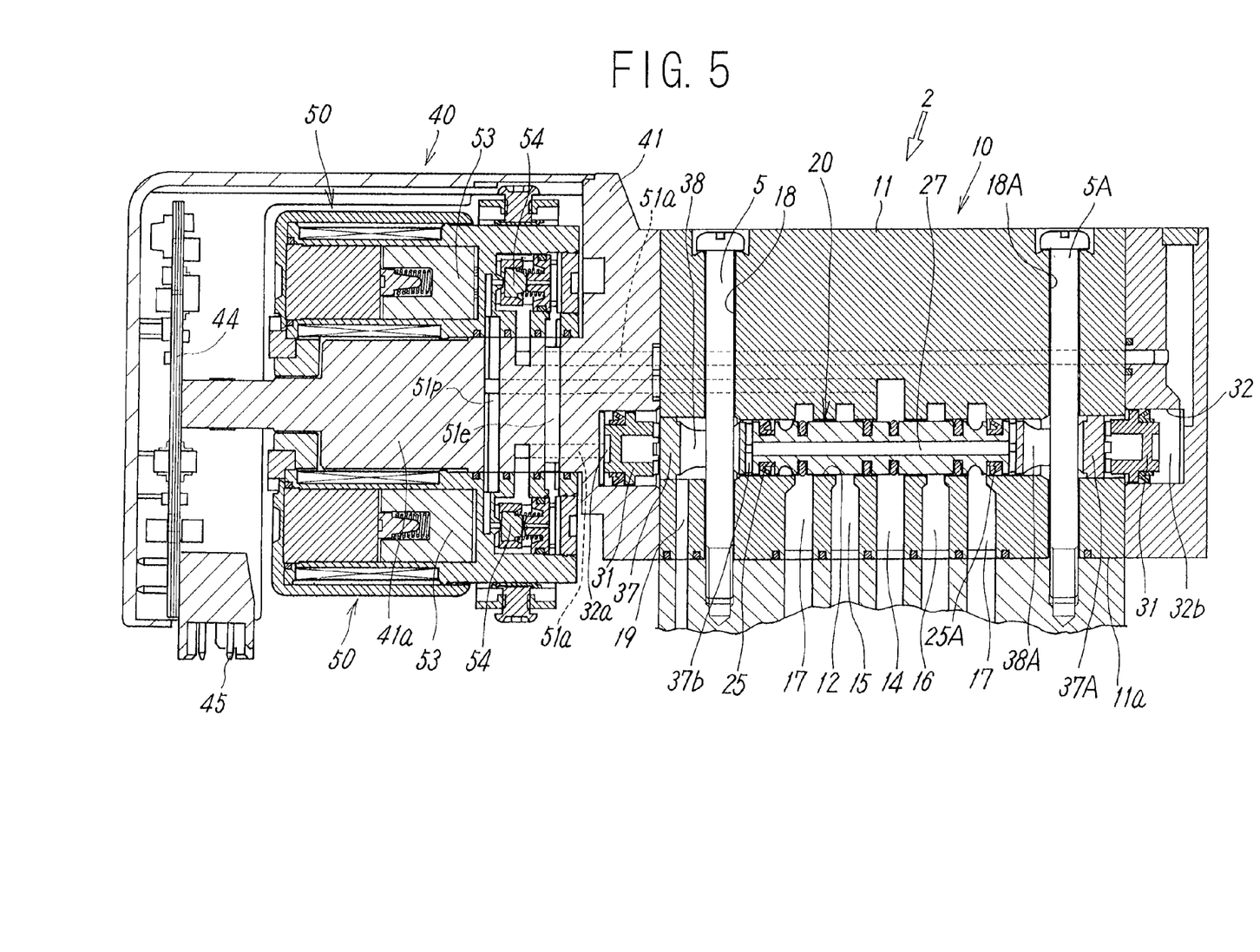
FIG. 5 is a longitudinal sectional view of a second embodiment of the present invention.
Figure 6:
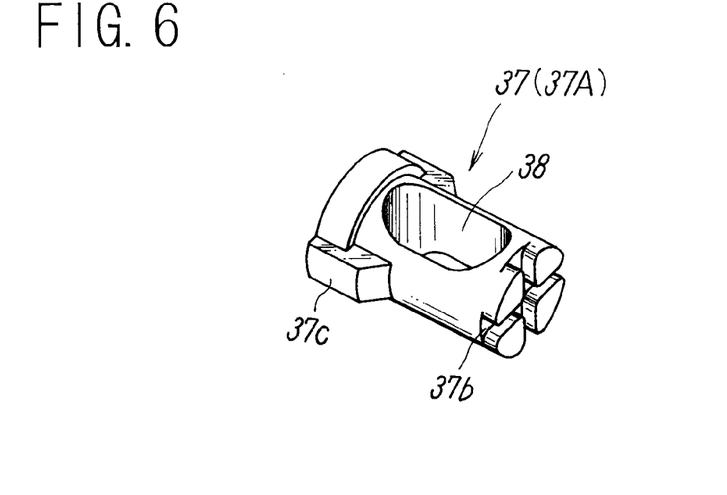
FIG. 6 is a perspective view of a slider in the second embodiment.

FIGS. 5 and 6 show a second embodiment of the present invention. In the first embodiment, the bolt insertion hole 18 is provided in the valve body 11, and the long-hole shaped escape portion 24 is provided in the two valve members 20 so that the valve body 11 is fixed to the base member 1 by the single mounting bolt 5 at one spot. In the second embodiment, the valve body 11 is fixed to the base member 1 by two mounting bolts 5 and 5A at two spots. For this fixation, a first slider 37 (See FIG. 6) and a second slider 37A (having the same structure as that in FIG. 6) brought into contact with the valve member 20 and moving with the valve member 20 within the valve hole 12 are provided at both end portions of the valve member 20, and long-hole shaped escape portions 38 and 38A similar to the escape portion 24 in the first embodiment are provided on the sliders 37 and 37A. The sliders 37 and 37A are formed separately from the valve member 20 and form a part of the operating member along with the valve member 20.

By providing the escape portions 38 and 38A with deviation in the width direction of the valve body 11, the escape portions can be also formed in a recess state opened on the one side face of the valve member 20.

The sliders 37 and 37A are interposed between the valve member 20 and the pistons 31 disposed on the both end sides thereof in order to transmit a driving force of the piston 31 driven by the pilot fluid pressure from the pilot electromagnetic valve 50, which will be described below in detail, to the valve member 20.

The entire configuration of the second embodiment will be specifically described. In the second embodiment, the single valve hole 12 is provided in the single valve body 11, and the ports 14 to 17 communicating with the valve hole 12 are constituted by the supply port 14 at the center of the valve body 11, the two output ports 15 and 16 disposed on the both sides thereof, respectively, and the discharge ports 17 disposed on both sides of the output ports 15 and 16, respectively, and they are 5-port valves driving the valve member 20 through the piston 31.

Also, the pistons 31 disposed at both ends of the valve member 20 through the sliders 37 and 37A have the pressure chambers 32a and 32b behind them, respectively, and driven by the pilot fluid pressure supplied from the two pilot electromagnetic valves 50 of the electromagnetic operation portion 40 through the pilot output passage 51a to the pressure chambers and has the driving force act to the valve member 20 through the sliders 37 and 37A. Since the electromagnetic operation portion 40 has the same configuration as the first embodiment, the same reference numerals as in the first embodiment are given to the major portions of the electromagnetic operation portion 40, and the description will be omitted. Such configuration is advantageous since the electromagnetic operation portion 40 can be used as a component common to other embodiments.

The fixation of the valve body 11 to the base member 1 in this second embodiment is performed by the two mounting bolts 5 and 5A as mentioned above at two spots. In order to mount the first mounting bolt 5, the bolt insertion hole 18 penetrating the valve body 11 and crossing the valve hole 12 is provided at a portion close to the end portion on the electromagnetic operation portion 40 side in the valve body 11. This bolt insertion hole 18 is provided at a position not affecting the switching function of the flow passage by the valve member 20, and in this embodiment, the hole is formed at a portion where the pressure fluid does not flow between the ports in the valve body 11 shut off by the seal member 25. However, an opened position of the bolt insertion hole 18 is not limited to the above-mentioned position, as will be described later.

On the first slider 37, the escape portion 38 through which the first mounting bolt 5 passes is provided so as to be opened on the axis of the bolt insertion hole 18 all the time. This escape portion 38 is a long hole extending in the axial direction of the slider 37 within a range in which the slider 37 moves for switching of the flow passage together with the valve member 20. By inserting the first mounting bolt 5 so as to penetrate the bolt insertion hole 18 of the valve body 11 and the escape portion 38 of the slider 37, the valve body 11 is fixed to the base member 1.

Also, the other second mounting bolt 5A is mounted so as to cross the valve hole 12 and the second slider 37A at a position on the side opposite the mounting position of the first mounting bolt 5 in the valve body 11. The structure for mounting the second mounting bolt 5A is substantially the same as the structure for mounting the first mounting bolt 5. That is, the bolt insertion hole 18A penetrating the valve body 11 is provided so as to cross the valve hole 12 at a position not affecting the switching function of the flow passage by the valve member 20, and a long-hole shaped escape portion 38A for avoiding contact with the second mounting bolt 5A during driving for switching of the flow passage is provided on the second slider 37A. This escape portion 38A is provided at a position shut off from the portion where the pressure fluid flows between the ports in the valve body 11 by the seal member 25A.

In this second embodiment, rotation of the valve body 11 around the one mounting bolt 5 or 5A is prevented by the other mounting bolt 5A or 5. Therefore, one of the two mounting bolts 5 and 5A functions as the rotation prevention mechanism, and thus, the rotation prevention mechanism by the setscrew 6 as in the first embodiment does not have to be provided separately.

The valve member 20 is driven by the piston 31 brought into contact with the both ends through the sliders 37 and 37A, but it is likely that the member malfunctions if the fluid pressure is sealed by either of the disposed spaces of the sliders 37 and 37A for some reason, and a through hole 27 having a space on both ends communicate with each other is provided at the center of the valve member 20 in order to avoid such a possibility, and moreover, the space containing the first slider 37 is opened to the atmospheric air through a vent hole 19 provided in the valve body 11. In FIG. 6, reference numeral 37b denotes a communication groove provided for communication between the through hole 27 and the space containing the slider 37, and reference numeral 37c denotes a projection portion preventing rotation of the slider 37, and the projection portion 37c is guided by a guide groove provided in an inner face of the valve hole 12. This structure is similarly applied to the slider 37A.

The selector valve 2 in the second embodiment is a double-pilot type electromagnetic valve provided with two pilot electromagnetic valves 50, but it may be a single-pilot type electromagnetic valve having only a single pilot electromagnetic valve 50. In this case, the piston 31 is brought into contact only with an end portion close to the end of the electromagnetic operation portion 40 side in the valve member 20, the pilot fluid pressure is supplied from the pilot electromagnetic valve 50 only to the pressure chamber 32a behind the piston 31, and the valve member 20 is returned by a return spring or the like having a returning force act from the other end side of the valve member 20. Since the other configurations and actions of the second embodiment are the same as those in the first embodiment, the same reference numerals as in the first embodiment are given to the figure and the description will be omitted.

Figure 7:
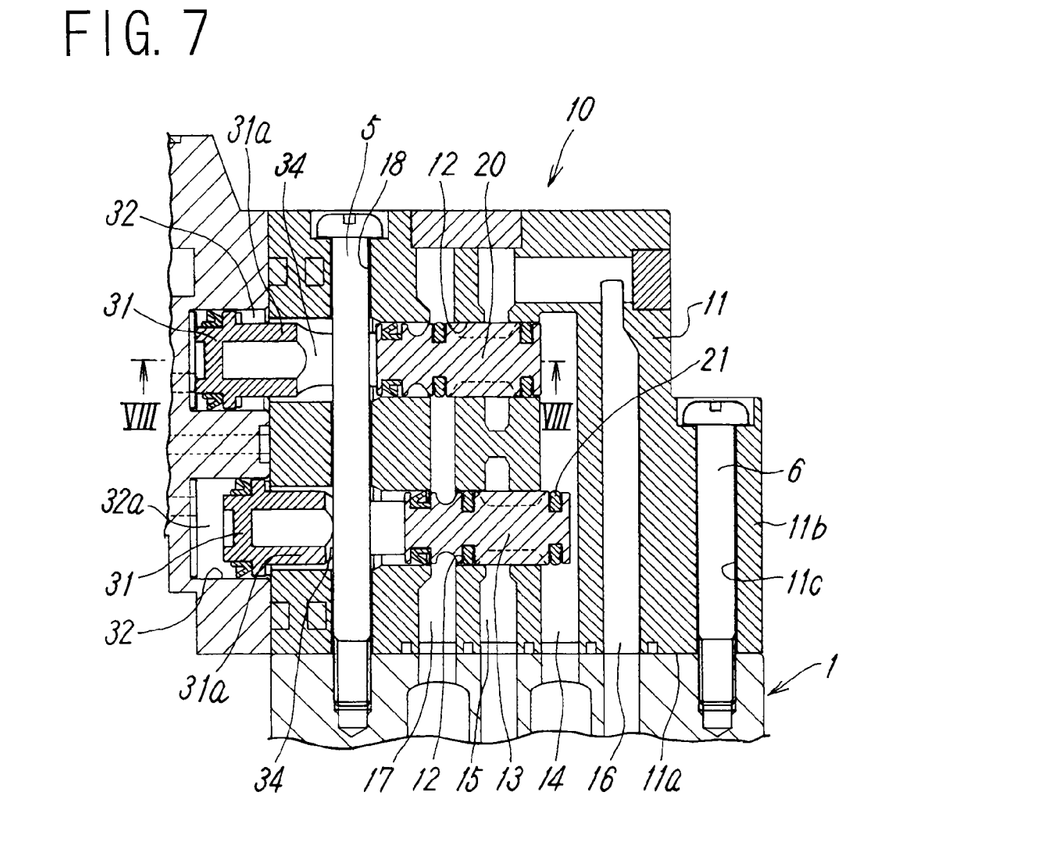
FIG. 7 is a longitudinal sectional view of an essential part of a third embodiment of the present invention.
Figure 8:
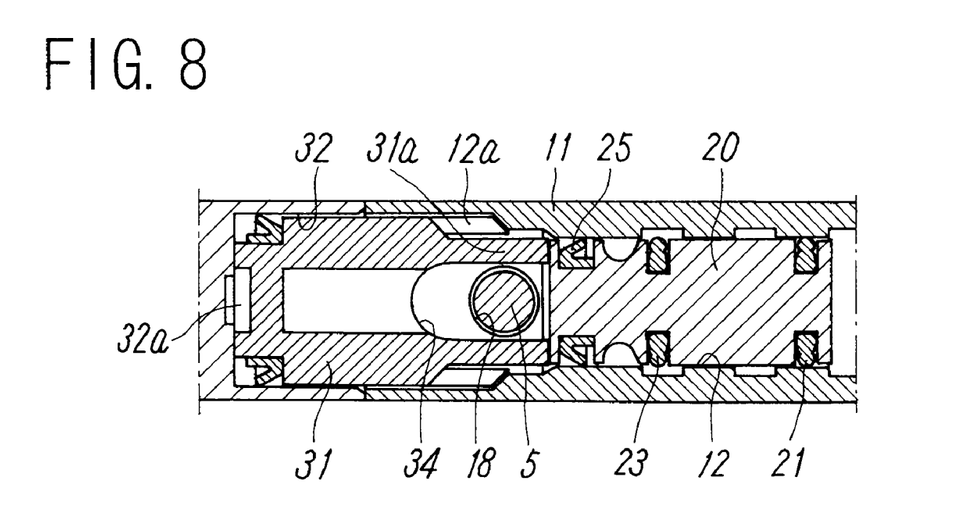
FIG. 8 is an enlarged sectional view at VIII-VIII position in FIG. 7.
Figure 9:
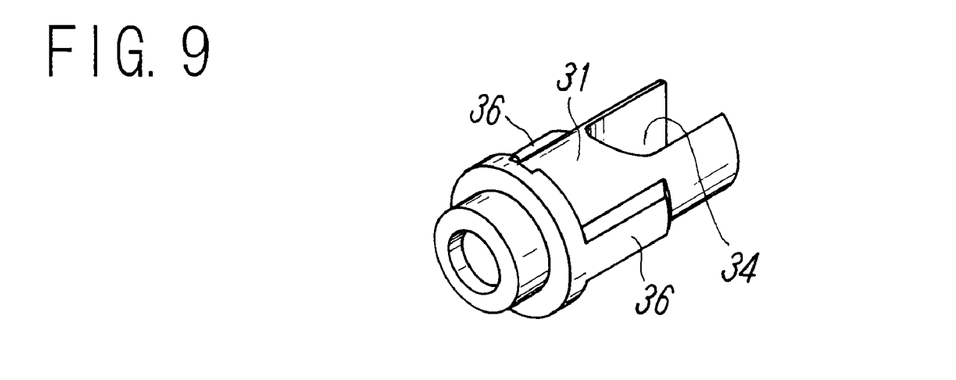
FIG. 9 is a perspective view of a piston in the third embodiment.

FIGS. 7 to 9 show a third embodiment of the present invention. In the first embodiment, in order to fix the valve body 11 to the base member 1 by the mounting bolt 5, the bolt insertion hole 18 is provided in the valve body 11 and also, the escape portion 24 is provided in the two valve members 20, but in this third embodiment, a part of the two pistons 31 driving the two valve members 20 are made to enter into the valve holes 12 and brought into contact with each of the valve members 20, and an escape portion 34 is provided in the portion entering into the valve hole 12 of the piston 31, that is, an entry portion 31a. The entry portion 31a of the piston 31 forms the operating member moving within the valve hole 12 for switching of the flow passage along with the valve member 20.

The configuration of the third embodiment will be described in more detail. In the third embodiment, since the configurations of the main valve portion 10 and the electromagnetic operation portion (not shown) are the same as those of the first embodiment except the configuration of the piston 31, which will be described below, the same reference numerals are given to the same or corresponding major portions in the first embodiment and the description thereof will be omitted.

The distinctive characteristics in the third embodiment are that, as mentioned above, the escape portion 34 is provided in the piston 31. Specifically, the entry portion 31a is formed at a part of the piston 31, the entry portion 31a is made to enter deeply into the valve hole 12 and the distal end is brought into contact with the valve member 20, and the bolt insertion hole 18 is provided so as to cross the valve hole 12 at a position of the entry portion 31a. Then, in order to avoid contact with the mounting bolt 5 during operation of the piston 31, the escape portion 34 which is long in the axial direction of the piston 31 is provided in the entry portion 31a. This escape portion 34 is in a groove state cut in from the distal end face of the entry portion 31a, but the escape portion 34 may be a long hole. Also, a projection portion 36 is provided on both sides of the piston 31, and the projection portion 36 is fitted in the guide groove 12a provided in the inner face of the valve hole 12, by which the piston 31 is prevented from rotating around the axis.

In this third embodiment, too, similarly to the first embodiment, the valve body 11 is fixed to the base member 1 by the single mounting bolt 5 at one spot, and in order to suppress the rotation of the valve body 11 around the mounting bolt 5 with respect to the base member 1, a rotation prevention mechanism made up of the setscrew 6 is provided at a position far from the mounting bolt 5 and the valve hole 12. Since the configuration and action of the rotation prevention mechanism is the same as those in the first embodiment, the same reference numerals are given to the same major constituent portions as those in the first embodiment, and the description will be omitted.

Figure 10:
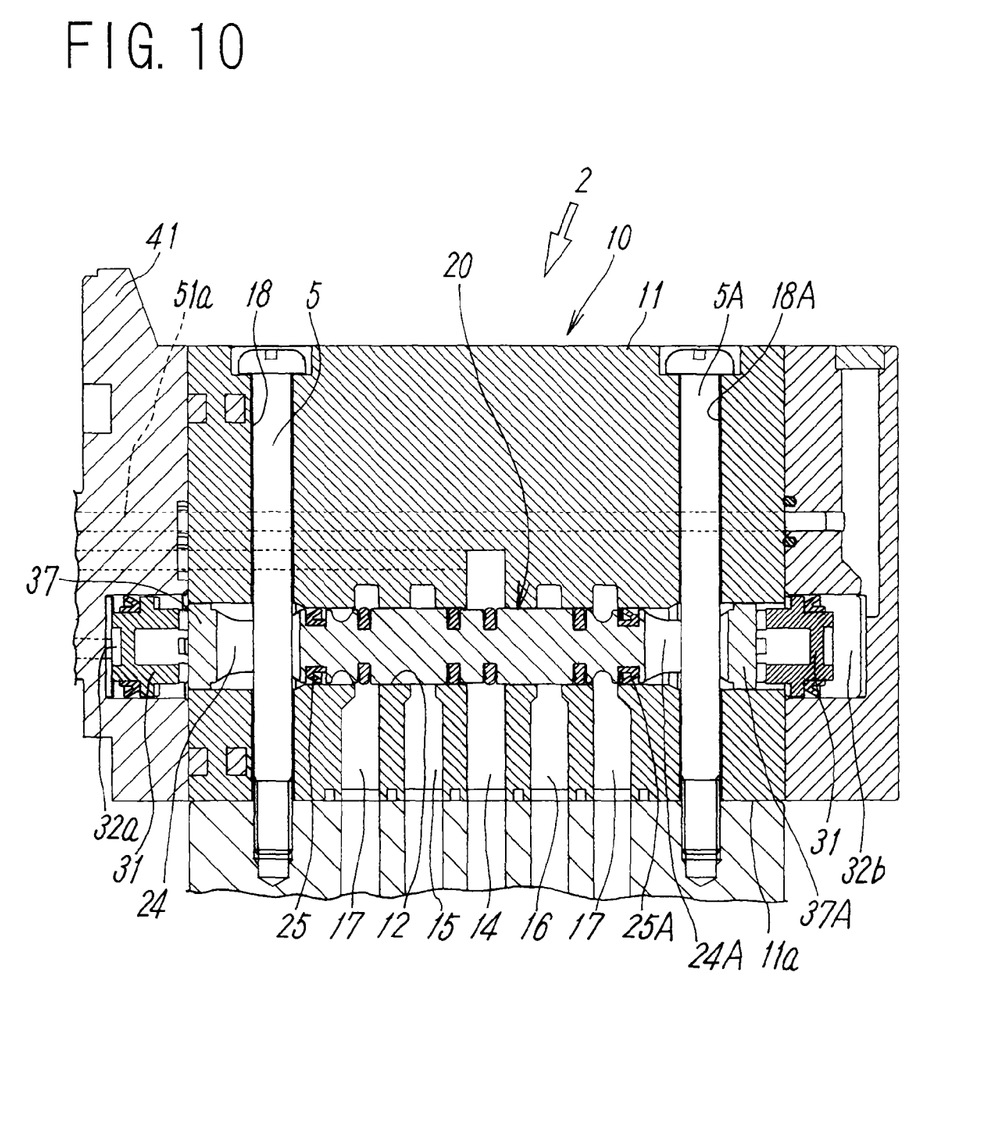
FIG. 10 is a longitudinal sectional view of an essential part of a fourth embodiment of the present invention.

A fourth embodiment shown in FIG. 10 is different from the second embodiment in a point that the sliders 37 and 37A are integrally formed with the valve member 20. That is, in this fourth embodiment, the single valve hole 12 is provided in the single valve body 11, and the ports 14 to 17 communicating with the valve hole 12 are formed similarly to the second embodiment. The sliders 37 and 37A form a part of the valve member 20, and the piston 31 similar to the second embodiment is brought into contact with the both ends of the valve member 20, that is, the end portions of the sliders 37 and 37A. Then, it is so configured that by supplying the pilot fluid pressure to the pressure chambers 32a and 32b behind the respective pistons 31 through the respective pilot output passages 51a by the two pilot electromagnetic valves 50, the valve member 20 is driven through the piston 31. Though the electromagnetic operation portion 40 is not shown, the portion is not different from the second embodiment.

Also, in the fourth embodiment, since the sliders 37 and 37A are formed integrally at both ends of the valve member 20, the through hole 27 at the center of the valve member 20 or the vent hole 19 in the valve body 11 as in the second embodiment is not provided.

Also, the fixation of the valve body 11 to the base member 1 in this fourth embodiment is performed by the two mounting bolts 5 and 5A at two spots similarly to the second embodiment. The bolt insertion hole 18 is provided at a portion close to the end of the electromagnetic operation portion 40 side in the valve body 11 for mounting of the first mounting bolt 5, and the valve body 11 is fixed to the base member 1 by the mounting bolt 5 at a position not affecting the switching function of the flow passage by the valve member 20. That is, the mounting bolt 5 is disposed at a portion where the pressure fluid between the ports does not flow in the valve body 11 shut off by the seal member 25. However, the opened position of the bolt insertion hole 18 is not limited to the above-mentioned position as will be described later.

On the other hand, in the slider 37 at one end of the valve member 20, a long-hole shaped escape portion 24 through which the mounting bolt 5 is inserted is formed so as to extend in the axial direction of the valve member 20 within a range in which the valve member 20 moves for switching of the flow passage. Then, by inserting the mounting bolt 5 so as to penetrate the bolt insertion hole 18 and the escape portion 24, the valve body 11 is fixed to the base member 1.

Also, the second mounting bolt 5A is provided so as to cross the slider 37A at the other end of the valve member 20 in the escape portion 24A. Since the mounting structure of the second mounting bolt 5A is substantially the same as the mounting structure of the first mounting bolt 5, the description on the detail will be omitted.

By fixing the valve body 11 to the base member 1 with the two mounting bolts 5 and 5A as above, the mounting bolts 5 and 5A also function as the rotation prevention mechanism, and the valve body 11 is fixed to the base member in a state in which rotation is prevented.

In the fourth embodiment, the selector valve 2 is a double-pilot type electromagnetic valve provided with the two pilot electromagnetic valves 50, but the valve can be constituted as a single-pilot type electromagnetic valve having only the single pilot electromagnetic valve 50. Since the other configurations and actions of the fourth embodiment are the same as those in the second embodiment, the same reference numerals as those in the second embodiment are given to the major constituent portions in the figure and the description will be omitted.

Figure 11:
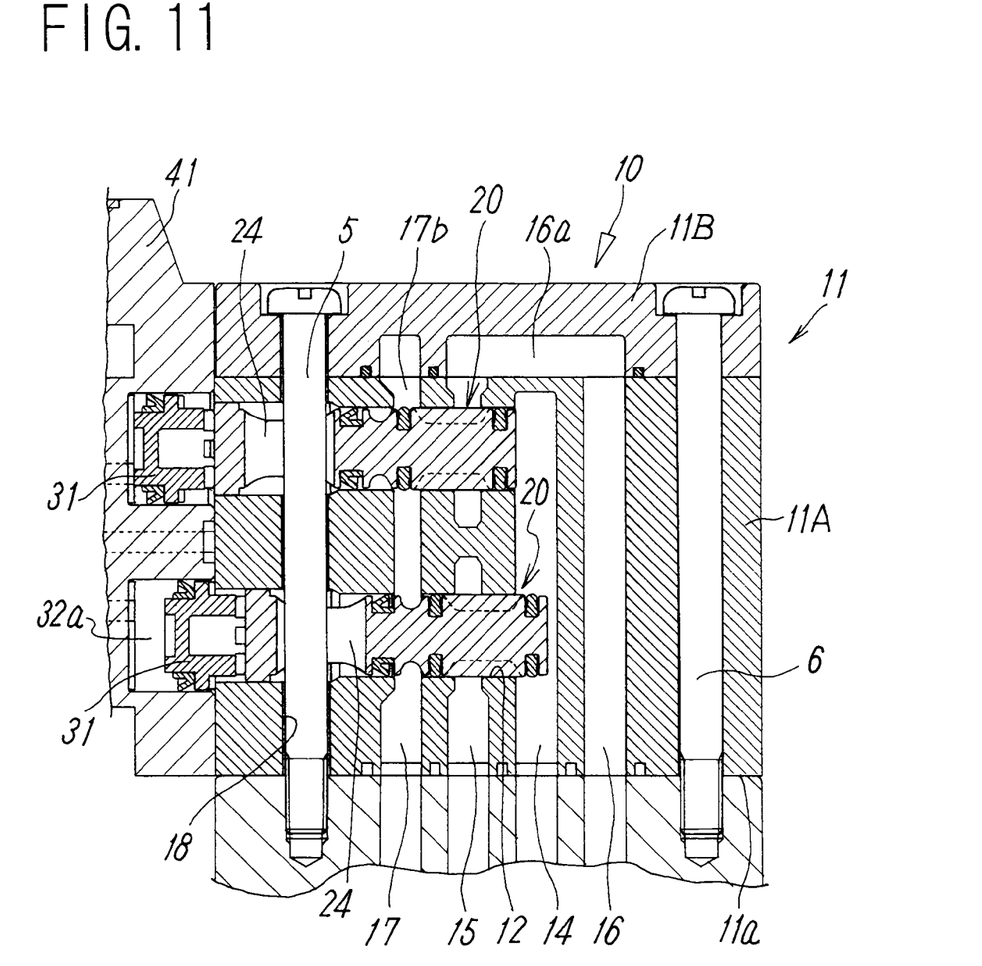
FIG. 11 is a longitudinal sectional view of an essential part of a fifth embodiment of the present invention.

In a fifth embodiment shown in FIG. 11, a part of the upper end of the valve body 11 is formed by a cover 11B for forming a flow passage, and a part of the output flow passage 16a and the discharge flow passage 17b formed in a main body portion 11A of the valve body 11 are formed in the cover 11B. Then, the mounting bolt 5 is screwed with the base member 1 through the bolt insertion hole 18 penetrating the cover 11B and the main body portion 11A. In this case, in the cover 11B, a part of a flow passage communicating with the valve hole 12 and an arbitrary one of the ports 14 to 17 can be formed, by which formation mainly of each flow passage formed in the main body portion 11A of the valve body 11 or the like is facilitated.

Also, in the fifth embodiment, the mounting bolt 5 penetrates the bolt insertion hole 18 of the main body portion 11A and the cover 11B of the valve body 11, but since the mounting bolt 5 is screwed in the base member 1 so as to fix the valve body 11 to the base member 1 by the structure similar to the first embodiment except that the cover 11B is provided, the same reference numerals as those in the first embodiment are given to the same or corresponding portions in the first embodiment in the figure and the description will be omitted. Moreover, the rotation prevention mechanism for suppressing rotation of the valve body 11 around the mounting bolt 5 is also the setscrew 6 similar to the first embodiment.

Since the other configurations and actions of the fifth embodiment are the same as those in the first embodiment including the portions not shown, the same reference numerals as those in the first embodiment are given in the figure and the description will be omitted.

If the valve body 11 is to be fixed to the base member 1 with the single mounting bolt 5 or 5A, in order to suppress the rotation of the valve body 11 around the mounting bolt 5 or 5A, the rotation prevention mechanism as mentioned above needs to be provided between the base member 1 and the valve body 11. As the rotation prevention mechanism, the setscrew 6 is provided at a position far from the valve hole 12 and the operating member in the first, third and fifth embodiments, and the valve body 11 and the base member 1 are locked by each other with this setscrew 6, while the one mounting bolt 5 or 5A also functions as the rotation prevention mechanism in the second and fourth embodiments. However, this rotation prevention mechanism is not limited to the setscrew 6 and the mounting bolt 5 or 5A, but a desired purpose can also be achieved by providing a locking portion and a locking receiving portion constructed as a projection and a recess or a hook and the like at a position far from the fixed position by the mounting bolt 5 or 5A, for example.

Figure 12:
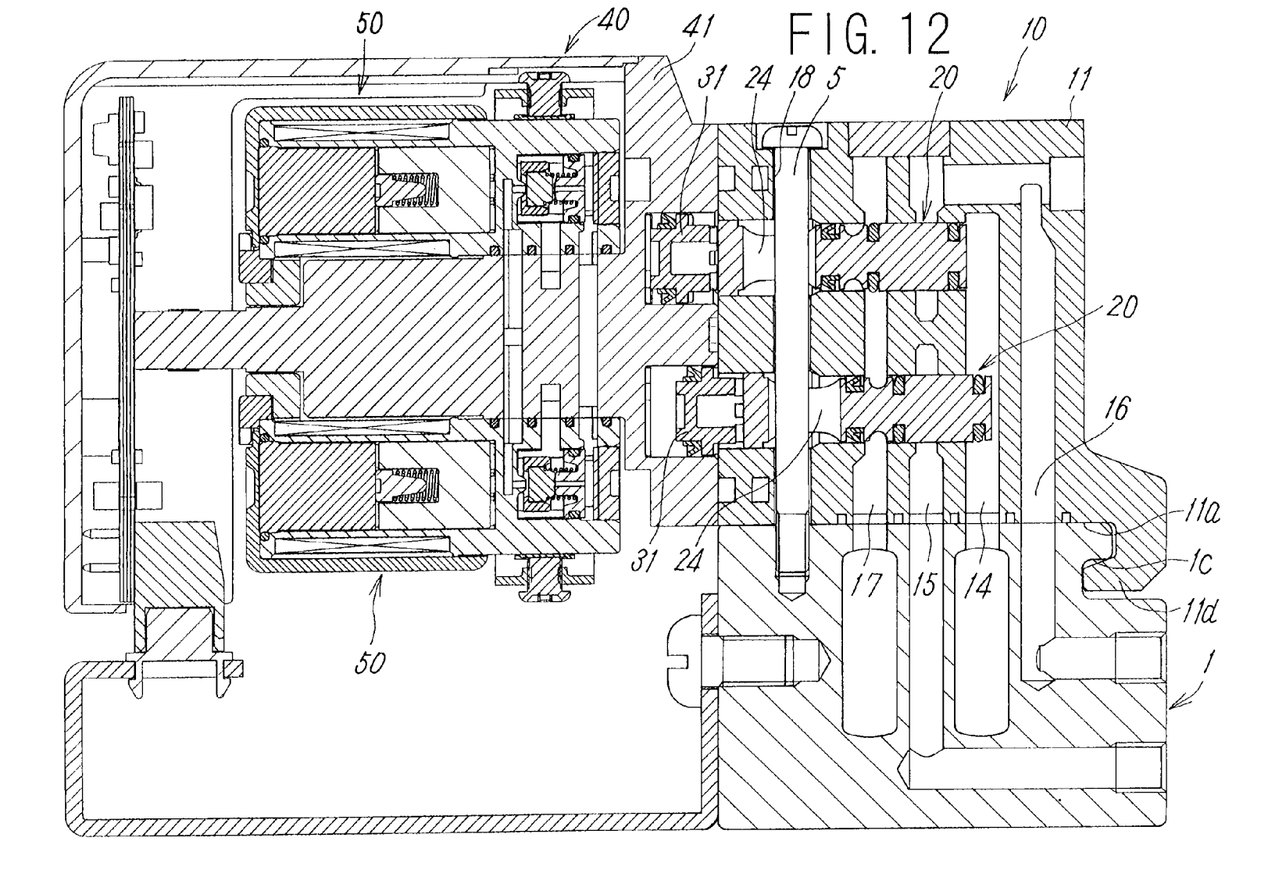
FIG. 12 is a longitudinal sectional view of a sixth embodiment of the present invention.

Specifically, as in a sixth embodiment shown in FIG. 12, by providing a locking portion 11d in a hook shape projecting toward the base member 1 side on the end portion of the valve body 11 and also by providing a locking receiving portion 1c in a recess shape by which the locking portion 11d is locked on a side end face of the base member 1, the rotation prevention mechanism for suppressing rotation of the valve body 11 can be provided. Alternatively, though not shown, it may be configured more simply that a pin-shaped locking portion is provided on the mounting face 11a of the valve body 11 and a recess-shaped locking receiving portion is provided on the base member 1.

Since the configurations other than the above in the sixth embodiment in FIG. 12 are the same as those in the first embodiment, the same reference numerals as the first embodiment are given to the major portions in the figure and the description will be omitted.

In the sixth embodiment, there is no problem if disposed positions of the bolt insertion holes 18 and 24 penetrating the valve body 11 and the valve member 20 are positions not affecting switching of the flow passage by the valve member 20, that is, positions where the pressure fluid does not flow between the ports as in each of the embodiments, as mentioned above, but they may be in the discharge flow passages 17a and 17b where the discharge fluid is discharged to the outside through the discharge port 17. However, in this case, there is a fear that foreign substances might intrude into the valve hole 12 through a gap between the bolt insertion hole 18 and the mounting bolt 5. Thus, in order to prevent intrusion of foreign substances, as shown in a seventh embodiment in FIG. 13, it is only necessary that a guide pipe 8 is inserted through the bolt insertion hole 18, and a seal member is provided between an inner periphery of the bolt insertion hole 18 and an outer periphery of the pipe 8 at positions of upper and lower ends of the bolt insertion hole 18, and then, the bolt 5 is inserted into the guide pipe 8. Since the other configurations of the seventh embodiment are the same as those in the first embodiment, the same reference numerals as the first embodiment are given to corresponding portions in the figure.

On the other hand, a position where the supply flow passage 14a or the output flow passages 17a and 17b communicate with the valve hole 12, that is, a position where the pressure fluid flows is basically inappropriate as a position where the bolt insertion hole 18 crosses the valve hole 12, but if the mounting bolt 5 can be inserted into the bolt insertion hole 18 in a sealed state, such a spot may be used. In order to insert the mounting bolt 5 into the bolt insertion hole 18 in a sealed state as above, a gap between the inner periphery of the bolt insertion hole 18 and the outer periphery of the mounting bolt 5 needs to be sealed at a portion before the bolt insertion hole 18 crosses the valve hole 12 and a portion after the crossing.

Figure 13:
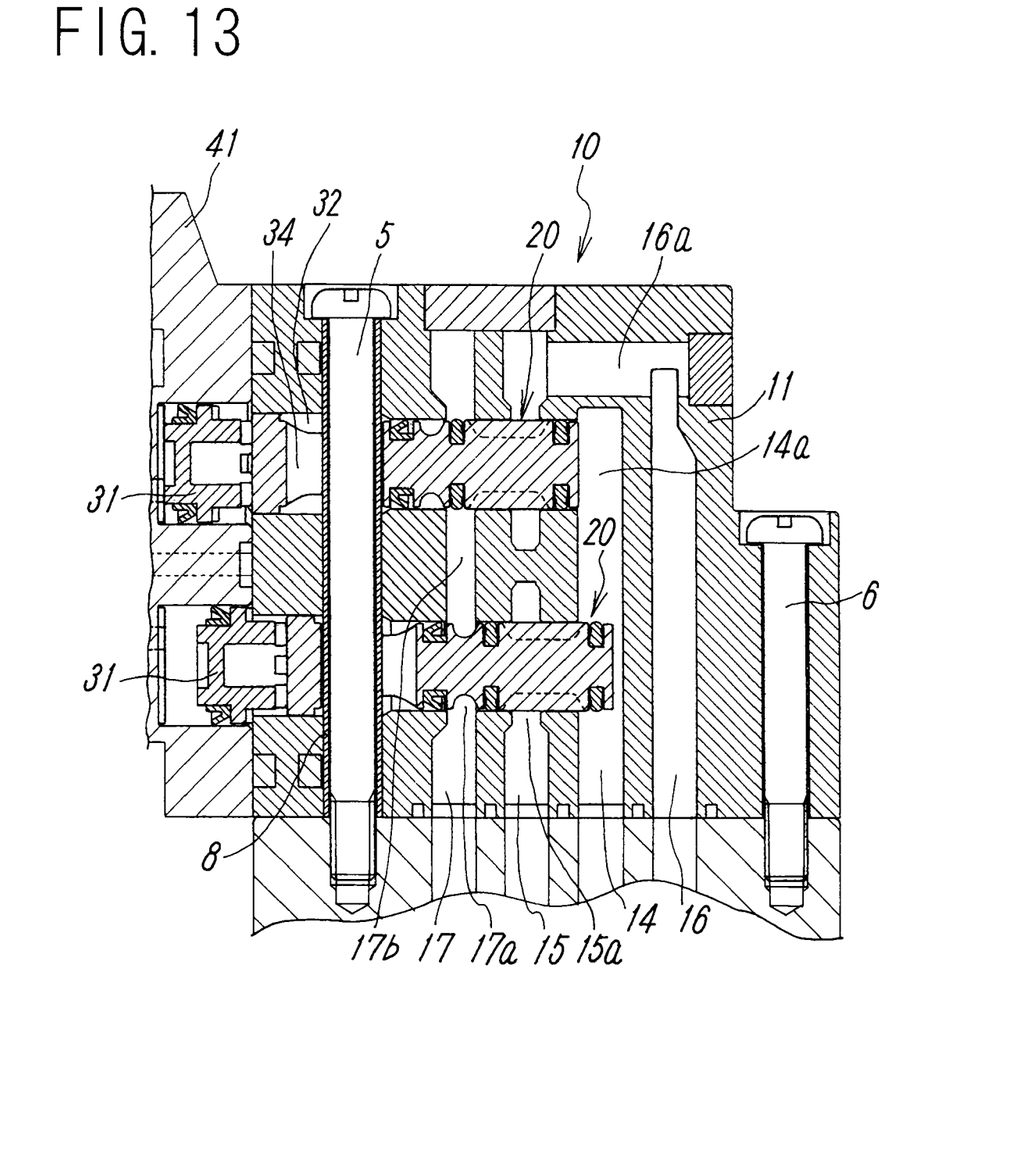
FIG. 13 is a longitudinal sectional view of an essential part of a seventh embodiment of the present invention.

Also, if the guide pipe 8 is provided in the bolt insertion hole 18, the guide pipe 8 is inserted into the bolt insertion hole 18 in a sealed state. That is, a gap between the inner periphery of the bolt insertion hole 18 and the outer periphery of the guide pipe 8 is sealed at the portion before the bolt insertion hole 18 crosses the valve hole 12 and the portion after the crossing, and the mounting bolt 5 is inserted into the guide pipe 8 and screwed with the base member 1.

The invention claimed is:

1. A selector valve device in which a selector valve is fixed to a base member with a mounting bolt, characterized in that:
    said selector valve has a valve body having a mounting face on a bottom face for mounting to said base member, a valve hole extending in parallel with said mounting face inside the valve body, a plurality of ports communicating with each other through the valve hole, an operating member moving within the valve hole in an axial direction when switching a flow passage between the ports, and an electromagnetic operation portion operating the operating member;
    said valve body has a bolt insertion hole extending in a direction crossing said valve hole within a width of the valve body, and said mounting bolt is inserted into the bolt insertion hole so as to cross said valve hole and the operating member; and
    said operating member has a hole-shaped or recess-shaped escape portion in order to avoid contact with said mounting bolt, and said mounting bolt passes through the escape portion.

2. The selector valve device according to claim 1, wherein in order to prevent rotation of said operating member and to prevent contact with said mounting bolt, a projection portion is formed on a side face of the operating member and a guide groove in which the projection portion is fitted is formed in a hole wall of said valve hole elongated in the axial direction of the valve hole.

3. The selector valve device according to claim 2, wherein a portion where said mounting bolt crosses the valve hole is shut off from said flow passage by a seal member mounted on the operating member.

4. The selector valve device according to claim 3, wherein said mounting bolt penetrates said valve body at a center in the width direction and also penetrates said valve hole and the operating member at a center in a diameter direction.

5. The selector valve device according to claim 2, wherein said mounting bolt penetrates said valve body at a center in the width direction and also penetrates said valve hole and the operating member at a center in a diameter direction.

6. The selector valve device according to claim 1, wherein a portion where said mounting bolt crosses the valve hole is shut off from said flow passage by a seal member mounted on the operating member.

7. The selector valve device according to claim 6, wherein said mounting bolt penetrates said valve body at a center in the width direction and also penetrates said valve hole and the operating member at a center in a diameter direction.

8. The selector valve device according to claim 1, wherein said mounting bolt penetrates said valve body at the center in the width direction and also penetrates said valve hole and the operating member at the center in a diameter direction.

9. The selector valve device according to claim 1, wherein the escape portion is a long hole elongated in the axial direction of the operating member.

10. The selector valve device according to claim 1, wherein said operating member is any of a valve member, a slider disposed in the valve hole in order to transmit an operation force from the electromagnetic operation portion to the valve member, and a piston for transmitting the operation force from the electromagnetic operation portion to the valve member.

11. The selector valve device according to claim 1, wherein there are two mounting bolts and both are disposed so as to cross said valve hole and the operating member at two spots on the valve body.

12. The selector valve device according to claim 1, wherein the mounting bolt is disposed at one spot on the valve body, and in order to prevent rotation of the valve body around said mounting bolt, a rotation prevention mechanism for having the valve body and the base member locked with each other is provided at a position on the valve body far from said valve hole and the operating member.

13. The selector valve device according to claim 12, wherein said rotation prevention mechanism is a setscrew.

14. The selector valve device according to claim 12, wherein said rotation prevention mechanism includes a locking portion and a locking receiving portion formed on said valve body and the base member and locked with each other.

* * * * *